United States Patent
Metivier et al.

(10) Patent No.: US 9,258,281 B2
(45) Date of Patent: Feb. 9, 2016

(54) SECURED METHOD FOR CONTROLLING THE OPENING OF LOCK DEVICES FROM MESSAGES IMPLEMENTING A SYMMETRICAL ENCRYPTION

(71) Applicant: OPENWAYS SAS, Saint Germain en Laye (FR)

(72) Inventors: Pascal Metivier, Saint Germain en Laye (FR); Aitor Agueda, Hendaye (FR)

(73) Assignee: OPENWAYS SAS, Feucherolles (FR)

( * ) Notice: Subject to any disclaimer, the term of this patent is extended or adjusted under 35 U.S.C. 154(b) by 77 days.

(21) Appl. No.: 14/050,392

(22) Filed: Oct. 10, 2013

(65) Prior Publication Data

US 2014/0195810 A1    Jul. 10, 2014

(30) Foreign Application Priority Data

Oct. 11, 2012  (FR) ...................................... 12 59694

(51) Int. Cl.
| | |
|---|---|
| *H04L 29/06* | (2006.01) |
| *G07C 9/00* | (2006.01) |
| *H04L 9/08* | (2006.01) |
| *H04L 9/14* | (2006.01) |

(52) U.S. Cl.
CPC ........ *H04L 63/0435* (2013.01); *G07C 9/00182* (2013.01); *H04L 9/0891* (2013.01); *H04L 9/14* (2013.01); *G07C 2009/0023* (2013.01)

(58) Field of Classification Search
CPC ..... H04L 63/0435; H04L 9/14; H04L 9/0891; G07C 9/00182; G07C 2009/0023
See application file for complete search history.

(56) References Cited

U.S. PATENT DOCUMENTS

| | | | | |
|---|---|---|---|---|
| 4,281,215 | A | | 7/1981 | Atalla |
| 5,222,137 | A | * | 6/1993 | Barrett et al. ................. 380/271 |
| 6,125,185 | A | | 9/2000 | Boesch |
| 2001/0028298 | A1 | * | 10/2001 | Liden et al. .................. 340/5.65 |
| 2002/0031228 | A1 | * | 3/2002 | Karkas et al. ................. 380/270 |
| 2005/0210283 | A1 | * | 9/2005 | Kato .............................. 713/200 |
| 2005/0226423 | A1 | * | 10/2005 | Li et al. ......................... 380/278 |
| 2006/0101270 | A1 | * | 5/2006 | Laitinen ........................ 713/176 |
| 2007/0050635 | A1 | * | 3/2007 | Popp ............................. 713/185 |

FOREIGN PATENT DOCUMENTS

| | | | |
|---|---|---|---|
| EP | 2 500 872 | | 9/2012 |
| FR | 2 876 858 | | 4/2006 |
| WO | WO 2006/136662 | * | 6/2006 ............... G07C 9/00 |

OTHER PUBLICATIONS

Search Report for FR 1259694, dated Apr. 18, 2013.

\* cited by examiner

*Primary Examiner* — Robert Leung
(74) *Attorney, Agent, or Firm* — Nixon & Vanderhye, P.C.

(57) ABSTRACT

A management site (10) generates an encrypted message by a public-key symmetrical encryption algorithm, the algorithm and the key being selected by the management site among a memorized list. The message (DKE), which includes an identifier of the encryption algorithm and key used, is transmitted to a portable device (16), which stores it. For the use, the message is transmitted to a secured module (20) that decrypts it, checks its compliance with an internal reference, and generates a digital accreditation controlling the unlocking of a lock device (18). The decryption is operated with the algorithm and the key recognized based on the identifiers of the message, selected among a list memorized by the secured module.

16 Claims, 1 Drawing Sheet

SECURED METHOD FOR CONTROLLING THE OPENING OF LOCK DEVICES FROM MESSAGES IMPLEMENTING A SYMMETRICAL ENCRYPTION

This application and claims priority to FR Patent Application No. 12 59694 filed Oct. 11, 2012, the entire content of which is hereby incorporated by reference.

The invention relates to the lock devices electrically controlled by means of a dematerialized and encrypted key, wherein such key can be conveyed by a portable object held by a user, such as a portable phone, a contactless badge or card, etc.

As used herein, "lock device" means not only a lock strictly speaking, i.e. a mechanism applied for example on a door so as to prevent the opening thereof, but also any device permitting to obtain a comparable result, for example a lock barrel considered solely, or a more specific locking device comprising various members not grouped together in a same lock case, the final purpose being to prevent, through mechanical means, the physical access to a given place or space, and to allow access to that place or space by unlocking the lock device, upon a command from the user, after having checked that this user has actually the access rights i) that are peculiar to him and ii) that are peculiar to the lock device. The lock device may also comprise, or be associated with, an alarm system that must be deactivated to allow access to a given space, or conversely, activated to protect this space before or after having left it. For the simplicity of description, it will be hereinafter simply referred to a "lock", but this term has to be understood in its wider sense, without any limitation to a particular type of equipment.

The portable object, when brought in the vicinity of the lock, acts as a key for commanding the opening thereof. Many systems are known for coupling the portable object to the lock in a galvanic way (contact smart card) or a non-galvanic way (inductive-coupling-based portable object or RFID card). Such coupling provides between the lock and the badge a communication making it possible in particular for the lock to read the accreditation data from the memory of the badge so as to operate the opening if the data is recognized as being compliant.

It is also possible to use instead of a dedicated badge a mobile phone, which makes it possible, by placing the phone in communication with a management site, to easily make in-line checking, modify the security elements or download new ones, etc.

The EP 2 282 297 A1 (Openways SAS) proposes a technique that can be used with any conventional mobile phone, based on the use of encrypted acoustic accreditations CAC (Crypto Acoustic Credential), in the form of single-use audio signals, consisted for example of a succession of dual tones, DTMF. Such acoustic accreditations are generated by a secured remote site and transmitted to the phone by usual phone transmission channels (voice or data), via the mobile phone operator MNO (Mobile Network Operator) and a trusted service provider TSM (Trusted Service Manager). To use the accreditation, the user brings his phone close to the lock and triggers the emission, by the loudspeaker of his phone, of the series of tones corresponding to the accreditation, so that these tones can be picked up by a microphone that is integrated in or coupled to the lock. The latter decodes the accreditation, checks it and, in case of compliance, unlocks the mechanical members.

The EP 2 306 407 A1 (Openways SAS) describes a variant of the previous technique, consisting in using the original accreditations, peculiar to the lock manufacturer, in the form of digital data DDC (Digital Data Credential), with their content and their own format, by converting them into acoustic accreditations CAC. By way of illustration, the cryptographic engine of the secured site creates an acoustic "envelope" into which is "slipped" the pre-existing accreditation DDC, and this independently of the content of the latter because the cryptographic engine does not need to know the definition of the fields, the coding, etc., of the accreditation DDC.

But the fact that the lock manufacturer/manager generates all the digital accreditations DDC ensures a secured identification of the approved users.

The so-generated acoustic accreditation CAC is transmitted to the portable phone to be reproduced by the latter in front of the lock. The lock operates a reverse conversion so as to render the original accreditation DDC based on the detected and analyzed acoustic accreditation CAC. In other words, the acoustic module of the lock "opens the envelope" (the acoustic accreditation CAC) to extract therefrom, in an intact state, the digital information DDC previously placed in this envelope by the cryptographic engine of the remote site, the whole without modifying the content of the accreditation DDC.

The EP 2 500 872 A1 (Openways SAS) describes an improvement of this technique, consisting in making so that the digital accreditation, which permits the lock unlocking, is no longer in the "envelope", but in a reading interface module coupled to the lock, for example in the firmware of this module. For that reason, it is no longer required to interface the portable object (portable phone or other) with the third-party source, and no longer needed to place a content in the envelope. The latter will be able to be empty, i.e. it will contain no third-party key such as a digital accreditation of the DDC type as in the prior art system. The reading interface module only checks the compliance of the envelope as such and transmits to the lock itself the accreditation (kept in a memory of the module) permitting to operate the lock unlocking. The envelope compliance checking is implemented based on data contained in a field of the latter, whose value is compared to an internal reference, such as a counter, of the interface module.

In any case, and unlike the conventional systems with badges or keys, in such a technique the matter is not to prevent the duplication of an envelope, but only to make a duplicated envelope inoperative. This permits in particular to use simple and sure non-secured coupling technologies between the portable object (portable phone or other) and the reading interface module (integrated to the lock).

The technique described in this document and in the previous ones may be implemented in two ways:
- by a first "in-line" and real time mode, with an immediate and direct bidirectional exchange of data between the phone and the management site (via the trusted third-party and the mobile phone operator) at the time of use, i.e. when the opening of the lock is asked for by the user;
- by a second "off-line" mode, implemented in particular if the access to the network is not possible at the time of use; this second mode involves a previous downloading of data from the management site to the phone and the storage of this data in a memory of the latter, for a later, postponed use.

The first mode makes it possible to check in real time that the phone actually belongs to an approved user, with immediate checking of a "black list" of users. It is also possible, insofar as a bidirectional communication exists, to collect at the management site many information about the use that is made of the envelope message: date and time of use, geographic location of the user, confirmation of the effective opening, various management information internal to the lock, etc.

On the other hand, in "off-line" mode, these functionalities are not available. The phone has to connect in advance to the management site to download a predetermined number of envelope messages that are stored in the phone. At the time of use, the user launches an application integrated in his phone, which searches for the first envelope message among those that have been stored, transmits it to the module of interface with the lock, and suppresses it from the memory, and so on for the following messages.

In such a context of off-line and postponed operation, it is imperative to ensure a maximum security of data transmissions from the management site to the portable phone in order to avoid any risk linked to possible interceptions of the communications or non-authorized duplication of the messages. The phone playing, in off-line mode, a role of autonomous intermediate storage, it is indeed possible to read the content of its memory and to duplicate or corrupt this content so as to attempt a fraudulent operation.

More precisely, it is advisable to secure the data transmission in a lock control system fulfilling the following constraints:
- multi-broadcasting of data from the management site toward a great number of locks managed simultaneously by this site;
- technically simple management of the locks, in particular by sharing common cryptographic keys, which supposes the use of a symmetrical encryption/decryption technique with a common cryptographic key memorized both on the management site side and on the lock side;
- between the management site and the locks, unidirectional communication having the following characteristics:
  - operation in off-line mode with temporary storage of the data in an intermediate element of the network (the phone), introducing that way a delay, a priori undetermined, in the retransmission of the information to the locks;
  - intermediate storage operated within easily accessible elements (the phones), which requires that the information has been previously encrypted by the management site and always travels in encrypted form on the transmission channels, the decryption intervening only at the end of the chain, in a secured module of the lock;
  - the locks, which form the terminations of the network, comprising only data receiving means, without possible (or necessary) retransmission of information back to the management site.

In a different context, i.e. the securing of the cryptographic elements of a pay television system, the FR 2 876 858 A1 describes a technique of diversification of the keys implementing lists of keys memorized both on the emitter side (at encryption) and on the receiver side (at decryption), with selection of the suitable key as a function of a simple key identifier transmitted with the video flow.

The present invention has for object a technique making it possible, when applied to lock devices, to dynamically diversify the encryption keys, by means in particular of lists of keys memorized in the lock device.

If a maximum security over the long term is desired, such a way to proceed however requires modifying these lists by regularly changing the keys used, in the same way as it is advisable to regularly modify the password of an access control system.

The problem of the invention is thus to define a procedure for updating the list of keys memorized in the secured module of the lock device, by substitution and/or adding of new keys in this list, this procedure being triggered and controlled automatically from the management site.

More precisely, the problem of the invention consists in making so that this updating procedure, which is intended to keep over the long term the high level of security of the system, cannot introduce a security breach in the latter.

For that purpose, the invention proposes a secured method for controlling the opening of lock devices such as that disclosed by the above-mentioned EP 2 500 872 A1, i.e. including the following steps:

a) by a management site:
   a1) generation of digital data;
   a2) encryption, according to a symmetrical method, of a field containing the digital data, by an encryption algorithm and with an encryption key; and
   a3) generation of a message containing the encrypted field;

b) transmission of the message, via a communication network, to a portable device held by a user and storage of this message in a memory of the portable device;

c) transmission of the message, by a short-range transmission technique, from the portable device to a secured module generator of digital accreditations, coupled to a lock device;

d) by the secured module generator of digital accreditations, analysis of the message by:
   d1) decryption, according to said symmetrical method, of the encrypted field;
   d2) checking of the message compliance with an internal reference memorized in the secured module; and
   d3) in case the message is proved compliant at step d2), generation by the secured module of a digital accreditation adapted to control the lock device unlocking upon recognition of the compliance of this accreditation.

Specifically of the invention:
- the encryption and the decryption use a common key memorized both by the management site and by the secured module, the management site and the secured module each memorizing a corresponding list of said common keys;
- for the encryption of step a2), the manager site operates a previous selection of a key among said list of keys memorized by the management site;
- the message generated at step a3) further contains an encryption key identifier, identifying the key used for the encryption of step a2), and
- step d) comprises a step of previous reading of the encryption key identifier, and the decryption of step d1) is operated with the key identified by said reading, selected among said list of keys memorized by the secured module.

Characteristically of the invention, the method comprises a procedure for updating, by substitution or/and addition of new keys, said list of keys memorized in a memory of the secured module, procedure in which:
- during the generation of a message, the management site encapsulates into the encrypted field of this message:
  - i) the new keys, or
  - ii) an identifier of a modifying function selected among several modifying functions adapted to permit the calculation of the new keys;
- the message is transmitted to the secured module addressee of the news keys via a portable device during an unlocking, by this portable device, of the lock coupled to this addressee secured module; and upon reception of this message, the secured module:
i) updates the keys memorized in the memory of the secured module, or, respectively
ii) recalculates the new keys based on the received modifying function identifier, and updates the keys memorized in the memory of the secured module with the so-recalculated keys.

The software code of said modifying functions is advantageously memorized in a firmware of the secured module.

Preferably, the selection by the management site of one key among said list of keys memorized is a pseudo-random selection.

The encryption key identifier may be contained in a non-encrypted field of the message, or encrypted according to a predetermined mode, known by the secured module.

In a preferential embodiment:
the management site and the secured module each memorize a corresponding plurality of encryption algorithms;
for the encryption of step a2), the management site operates a previous selection of an algorithm among said plurality of algorithms memorized by the management site;
the message generated at step a3) further contains an encryption algorithm identifier, identifying the algorithm used for the encryption of step a2), and
step d) comprises a step of previous reading of the algorithm identifier, and the decryption of step d1) is operated with the algorithm identified by said reading, selected among said plurality of algorithms memorized by the secured module.

The encryption algorithm identifier is preferably contained in a non-encrypted field of the message, or encrypted according to a predetermined mode, known by the secured module.

In any case, it is preferable to associate a date of expiry to each encryption key, an updating procedure being automatically launched by the management site at least for this encryption key before said date of expiry. According to another aspect of the invention, it is further provided steps of generation by the management site, for a specific portable device, of a packet comprising a plurality of said messages, transmission of this packet to this portable device, and storage of the packet in a memory of the portable device. The messages comprised in a same packet are all different and each contain an identifier of a lock device whose opening is authorized by said specific portable device, and a sequencing marker associated with this lock device. The analysis of step d) then comprises a checking of the fact that the message transmitted to the secured module by the portable device corresponds well to the lock device effectively coupled to this secured module, and of the coherence of the sequencing marker contained in this message with a sequence number memorized in the secured module and constituting said internal reference.

In the latter case, it is possible to further provide, in case the message is proved compliant at step d2), a step of updating of the sequence number memorized in the secured module, as a function of the sequencing marker contained in the received message and/or, if a previous authorization relating to a prior user is stored in the secured module, invalidation of this authorization.

An exemplary embodiment of the device of the invention will now be described, with reference to the appended drawings in which same reference numbers designate identical or functionally similar elements through the figures.

Figure 1:
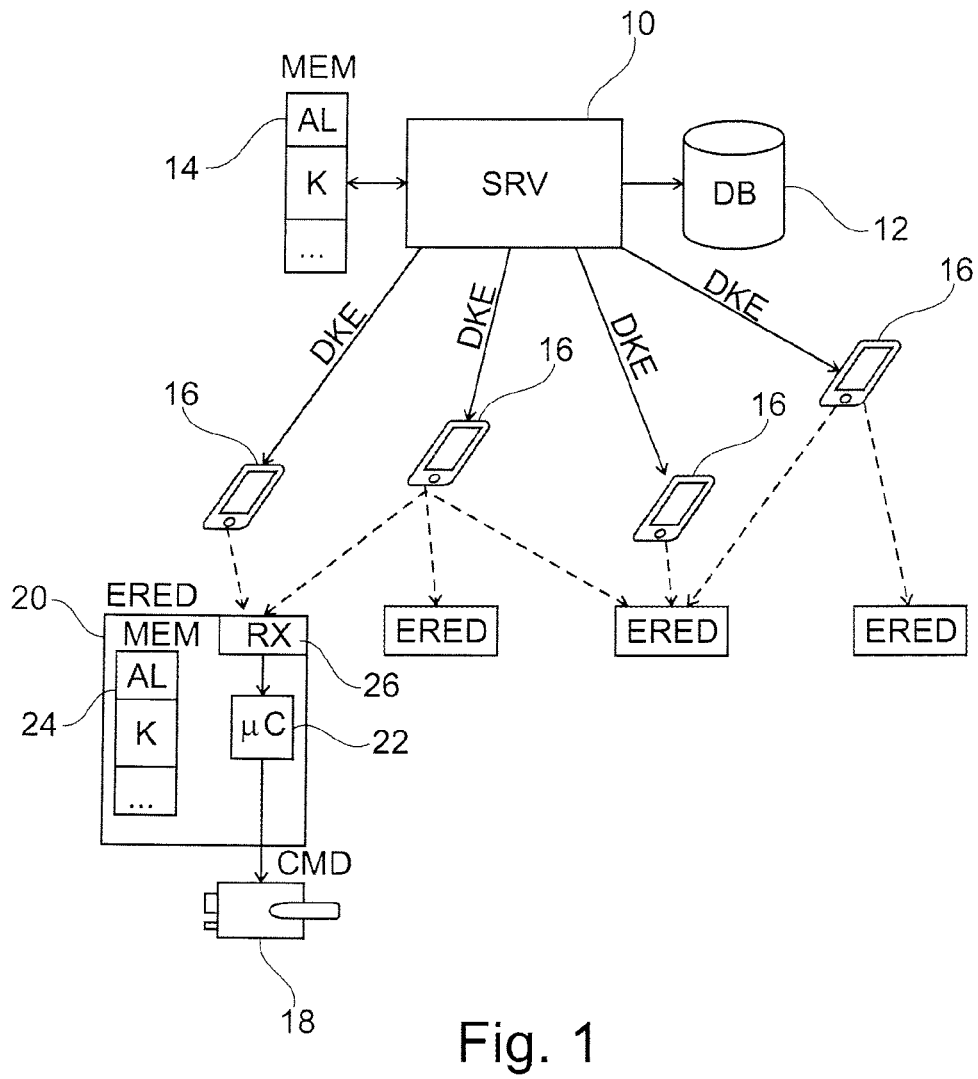
FIG. 1 is a schematic representation of the various elements involved in the implementation of the invention.

In FIG. 1 shows schematically the various elements of the system of the invention, which is of a type comparable to that described in the above-mentioned EP 2 500 872 A1, to which reference can be made for more details.

A management site or central server 10 generates messages, hereinafter denoted DKE (Digital Key Envelope) by means of an applicative software based, on the one hand, on data contained in a database of users and locks 12 and, on the other hand, on encryption algorithms and keys kept in a memory 14. The DKE messages are transmitted to communication devices 16, typically consisted by portable phones at the disposal of the different users registered by the management site, via a mobile network operator (MNO) and a trusted site of management (TSM), according to techniques that are well known in themselves and that will not be described in detail.

The DKE messages are intended to permit the opening of a lock device 18. For that purpose, the DKE message downloaded and memorized in the phone 16 is transmitted to a secured module 20 referred to as ERED (Envelope Reading Electronic Device), which is a part of the lock device 18.

The coupling between the phone 16 and the secured module 20 may be operated by various techniques well known in themselves, such as acoustic transmission, inductive coupling of the NFC type (in particular peer-to-peer), Bluetooth coupling, another radiofrequency coupling, infrared, light, vibration coupling, etc., wherein the coupling does not need at all to be secured.

The secured module 20 implements a microcontroller 22 and a receiving circuit 26 adapted to receive the DKE message that is transmitted to it by one of the above-mentioned coupling modes. The module 20 also includes a memory 24 permitting in particular to manage the different operations of decryption of the DKE message received, this memory storing in particular a series of encryption keys as well as software code corresponding to various decryption algorithms.

When receiving a message, the module 20 checks the integrity and validity of this message and generates a digital accreditation CMD permitting in particular to unlock the lock 18, and/or any other action useful for the management of the latter, for example a command of revocation of an authorization given to a prior user (typical case of the hotel room locks).

General Operation of the System

Figure 2:
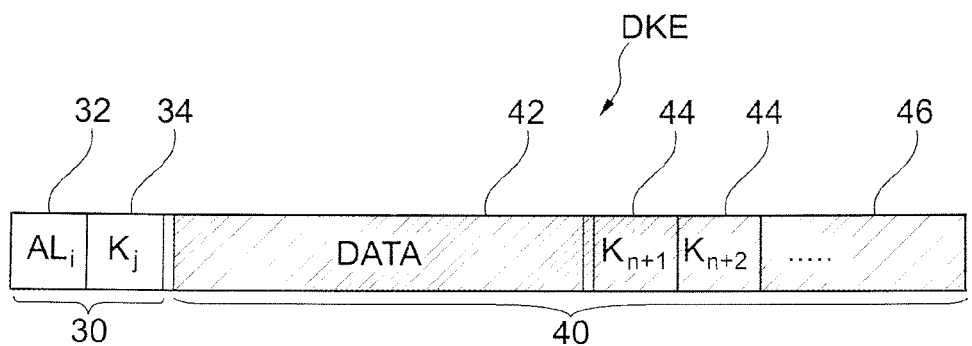
FIG. 2 illustrates the structure of the data block used by the method of the invention.

FIG. 2 illustrates the basic structure of a DKE message. The latter includes two areas 30 and 40, with:
a non-encrypted area 30 (or encrypted with a method known in advance), which contains a field 32 with an indicator $AL_i$ of the encryption method, referring to a particular algorithm used for encrypting the area 40, and a field 34 containing the key K, specifically used, with this algorithm $AL_i$ for encrypting the area 40;
an encrypted area 40, which contains in a field 42 data DATA and possibly, in appended fields 44, 46, other data not used for the lock unlocking control, but for other operations, for example maintenance or updating of the information memorized in the lock device.

The encryption method used are symmetrical encryption methods, which may be known methods, such as AES, 3DES, etc., or "proprietary" methods, peculiar to the designer of the system.

The encryption method (algorithm $AL_i$) used for encrypting the area 40 is modified and chosen among a plurality of methods, this choice being made at each generation of a DKE message by the management site 10, for example according to a pseudo-random draw. The matter is to make unpredictable the determination of the encryption method that will be chosen.

Comparably, not only the encryption method is modified at each generation of a DKE message, by the encryption key is also modified, here again by pseudo-random draw among a list of keys kept in the memory 14 of the management site.

These two selections (algorithm and key) are combined in an unpredictable manner (random or not), so that the algorithm/key combination takes the greatest possible number of values, with for result that the total number of possible encryptions is equal to the number of encryption methods multiplied by the number of keys available for each method.

The various algorithms and the various keys are kept in memory both at the management site 10 (memory 14) and at each secured module (memory 24).

The cryptographic key that is used may be a same key for all the locks of a site, or a different key for each lock. In the latter case, the whole security of the system is increased due to the uniqueness of the cryptographic key, which additionally to the server of the management site, is memorized in only one place on the side of the lock devices.

When the module 20 receives a DKE message, it reads in the field 30 i) the indicator $AL_i$ identifying the encryption method used, and ii) the encryption key $K_j$, selects among several algorithms the one that corresponds to the method read in the DKE message, applies to this algorithm the key that has been read, and decrypts the area 40 so as to deliver in clear the field of data DATA and the auxiliary fields possibly contained in this encrypted area.

Updating And Broadcasting of the Encryption Keys

The various encryption keys used are implanted in the memory 24 of each secured module during a procedure of initialization.

To increase the security, these keys have to be periodically modified. To avoid reiterating the initialization, which is a procedure rather heavy to implement (it is required to displace an operator near the locks), the invention proposes to use the DKE messages transmitted at the time when the users open the locks to broadcast on this occasion new encryption keys, without implementing a lock initialization process.

For that purpose, the new keys $K_{n+1}$, $K_{n+2}$ . . . are included in the auxiliary fields 44 of the encrypted area 40 of the DKE messages generated by the management site 10 and broadcasted to the phones 16.

At an opening command by a user, after decryption of the DKE message, the secured module 20 uses the so-transmitted new keys to update the list of encryption keys contained in its memory 24. The new keys may replace the existing keys (substitution), or be added to these latter, resulting in a still greater number of possible keys, with a correlative improvement of the general security of the system.

The new keys can be transmitted directly, encapsulated as such in the encrypted area 40 of the DKE message.

As a variant, they can be transmitted indirectly, by encapsulating in the encrypted area 40 not the keys themselves, but an identifier of a function adapted to modify the keys already stored in the memory 24 of the secured method. The new keys will be deduced from the old ones by an operation of the form: new key=$f_n$ (old key), several corresponding transform functions $f_1$, $f_2$, $f_3$ . . . being implemented in the secured module, preferably in the firmware rather than in a random access memory.

When receiving the DKE message, after decryption, the secured module 20 reads the identifier of the particular transform function used and applies the latter to the keys of the current list in memory, to calculate new keys that will be substituted (or added) to the old ones.

This indirect mode of propagation of the keys has an increased security because the keys, even encrypted, are not transmitted as such. On the other hand, it reduces the length of the message, because the length of a transform function identifier is far shorter than that of an encryption key strictly speaking.

Protection Against Duplication of the Messages

The messages are subjected to a multi-broadcasting and travel through non-secured communication means, and they are further stored temporarily in the memories of the phones. The duplication of a message or the reconstruction thereof are therefore relatively easy, and it is thus necessary to provide means permitting to make a fraudulently duplicated message inoperative when applied to a lock device.

However, as the system operates off-line and in a desynchronized manner, it is not possible to implement techniques based on timestamping, and all the more since it would be easy to modify the internal clock of a phone to reactivate the validity of a given message.

In the case of the invention, the system implements a checking of conformity based on a sequential counter, implemented based on data contained in a field of the envelope, whose value is compared to an internal counter of the interface module.

More precisely, when the message are sent to the phones, these messages are grouped into packets, one packet being intended to a given lock and being unique for this one.

Each packet contains a series of messages (a series of DKE) corresponding specifically to this lock. Each message has a unique validity, thanks to a sequence number associated with each lock.

Such a packet may be, for example, constituted by the data of the following Table 1, in the form of a matrix where each column corresponds to a packet sent to the phone, and the notation "Ey seq x" means "the sequence number x for the lock y", this data being included in the field DATA of the encrypted area 40 of the DKE message.

TABLE 1

Number of times the lock Ey can be open: seq 1 . . . seq n
P: pointer on the current sequence number (seq x) for the lock Ey (one pointer per line of the matrix)

| | P: ↓ → | ↓ → | ↓ → | ↓ → | ↓ ... | ↓ |
|---|---|---|---|---|---|---|
| Locks accessible with the phone: E1 . . . Em | E1 seq 1 | E1 seq 2 | E1 seq 1 | ... | ... | E1 seq n |
| | E2 seq 1 | E2 seq 2 | ... | | | ... |
| | E3 seq 1 | ... | ... | | | ... |
| | ... | | | | | ... |
| | Em seq 1 | Em seq 2 | | | | Em seq n |

However, insofar as several phones may control several locks, the sequences used cannot be simply consecutives. In this case, it is added to the sequence number x a prefix corresponding to an identifier or a sequence number peculiar to the phone: for a given phone, this prefix will be a constant, whereas the sequence number x will be incremented by one unit at each successive message of the packet sent to this phone. In other words, the identifier of the phone will play a role of offset of the sequence. Table 2 hereinafter gives an example of packet of messages formed that way:

TABLE 2

|  | Phone # 0 | Phone # 1 | Phone # 2 | Phone # N |
|---|---|---|---|---|
| Value of x for a given lock | 0 000 | 1 000 | 2 000 | N 000 |
|  | 0 001 | 1 001 | 2 001 | N 001 |
|  | 0 002 | 1 002 | 2 002 | N 002 |
|  | ... | ... | ... | ... |
|  | 0 999 | 1 999 | 2 999 | N 999 |

Moreover, at the time of generation of the message, the management site incorporates thereto a date of expiry, so as to limit the validity thereof in time. After decryption of the message by the module 20, this date of expiry is compared to the current date and time of the real time clock of the module, to verify that the message is not expired.

The possible range of sequence values for a given phone ('000' to '999' in the example of Table 2 above) will have to be wide enough no to close the loop—in this example, from the last value '999' to the first value '000'—before the date of expiry, which will otherwise have for effect to reactivate the messages with old sequences.

At each lock opening command, the new sequences outdates the preceding ones. More precisely, the method operates as follows:
- at the time of coupling with the secured module, the phone collects the identifier y of the lock;
- the phone then selects in the memorized matrix the line corresponding to this lock Ey, among the different locks E1 to Em;
- the phone sends to the module the data Ey seq x corresponding to the current position of the pointer P then, for the line that has been selected (that corresponding to the lock Ey), offsets by one unit the position of the pointer. If the pointer was at the last position of the line, a message is displayed to the user to inform him that he has to reconnect to the management site to obtain new messages so as to generate others commands for this same lock;
- to be considered as compliant by the module, the message received from a given telephone has to present a value of the sequence number seq x higher than the value kept in memory for that phone within the module.

To take into account the fact that several users (i.e. several phones) may be authorized to operate the same lock, each lock keeps in memory several series of sequences, with one series for each phone having actuated the lock and each of these series memorizing the last value of the sequence. Incidentally, insofar as the sequence value corresponding to a phone is contained in only a few bytes, this multiplication of the series of sequences does not pose particular difficulty taking into account the storage capacities available in the locks.

Initialization of the System

In their initial state, the lock devices do not contain the information and data for the decryption and the verification of the messages.

It is therefore necessary to accede thereto a first time and to apply a specific initialization command. This initialization command is encrypted with a temporary transport key, incorporated in the firmware. Once obtained the access to the memory 20, the encryption algorithms and the keys are written therein and the transport key is deactivated. The lock device is then fully functional, ready to operate in accordance with the process exposed hereinabove.

During the initialization, in addition to the keys, various pieces of service information are charged in the memory, such as room number or door number, setting of the internal real time clock, etc.

Once the initial keys loaded in a lock, they can be modified more or less frequently, before their date of expiry, by the above-described process of substitution or addition of new keys, on the occasion of an opening operation by a phone of a user and without local intervention of an operator.

This technique permits in particular to avoid a very heavy management of autonomous lock devices. These latter thus require only one intervention on site, for the implantation of the initial keys, with regular updating via the phones of the users at the time of opening operations.

The invention claimed is:

1. A method in secured module comprising a lock device, the method comprising:
   during an initialization operation of the secure module, storing plural encryption algorithms and plural encryption keys in a memory of the secure module but not in a portable device;
   during a lock management operation:
      wirelessly receiving from the portable device a message comprising digital data encrypted at a management site by a management site-selected one of the plural encryption algorithms and with a management site-selected one of the plural encryption keys, the message comprising:
         (1) an indicator of an encryption method which refers to the management site-selected one of the plural encryption algorithms;
         (2) an encryption key which is the management site-selected one of the plural encryption keys; and
         (3) the encrypted digital data;
      using the indicator to select among the plural encryption algorithms a selected encryption algorithm which is the management site-selected one of the plural encryption algorithms;
      applying the encryption key to the selected encryption algorithm to perform a decryption of the encrypted digital data so that the decryption is performed at the secure module and not at the portable device; and,
      managing the lock device in accordance with the message;
   the secured module receiving plural messages from the portable device, with each of the plural messages including a sequence number which differs from the sequence number of its successor,
   the secured module checks conformity of the received messages using the sequence number and a counter maintained by the secured module; and
   wherein the secured module is connected to plural lock devices, and wherein the method further comprises receiving plural sequence numbers for each of the plural lock devices.

2. The method of claim 1, wherein the lock management operation comprises a lock opening operation, and wherein managing the lock device comprises opening the lock device.

3. The method of claim 1, further comprising during the lock management operation obtaining from the encrypted digital data information for updating the plural encryption keys stored in the memory.

4. The method of claim 3, further comprising using the information to replace existing encryption keys stored in the memory.

5. The method of claim 1, further comprising using the information to add new encryption keys to existing encryption keys stored in the memory.

6. The method of claim 1, wherein the information obtained from the encrypted digital data comprises new encryption keys.

7. The method of claim 1, wherein the information obtained from the encrypted digital data comprises an identifier of a function; and wherein the method further comprises using the function to modify existing encryption keys stored in the memory to obtain new encryption keys.

8. The method of claim 1, further comprising the secured module receiving plural messages from respective plural portable devices, with each of the sequence numbers including an indication of the respective one of the plural portable devices with which it is associated.

9. A secured module for use with a lock device, the secured module comprising:
   a memory configured to storing plural encryption algorithms and plural encryption keys during an initialization operation of the secure module;
   a receiving circuit configured to wirelessly communicate with a portable device which does not store the plural encryption algorithms and plural encryption keys and to receive from the portable device a message comprising digital data encrypted at a management site by a management site-selected one of the plural encryption algorithms and with a management site-selected one of the plural encryption keys, the message comprising:
   (1) an indicator of an encryption method which refers to the management site-selected one of the plural encryption algorithms;
   (2) an encryption key which is the management site-selected one of the plural encryption keys; and
   (3) the encrypted digital data;
   a controller configured, during a lock management operation:
   to use the indicator to select among the plural encryption algorithms a selected encryption algorithm which is the management site-selected one of the plural encryption algorithms;
   to apply the encryption key to the selected encryption algorithm to perform a decryption of the encrypted digital data so that the decryption is performed at the secure module and not at the portable device;
   to manage the lock device in accordance with the message;
   to receive plural message from the portable device, with each of the plural messages including a sequence number which differs from the sequence number of its successor, and
   to check conformity of the received messages using the sequence number and a counter maintained by the secured module; and
   wherein the secured module is connected to plural lock devices, and wherein the controller is further configured to receive plural sequence numbers for each of the plural lock devices.

10. The secured module of claim 9, wherein the lock management operation comprises a lock opening operation, and during the lock opening operation the controller is configured to open the lock device.

11. The secured module of claim 9, wherein during the lock management operation the controller is configure to obtain from the encrypted digital data information for updating the plural encryption keys stored in the memory.

12. The secured module of claim 11, wherein the controller is configured to use the information to replace existing encryption keys stored in the memory.

13. The secured module of claim 9, wherein the controller is further configured to use the information to add new encryption keys to existing encryption keys stored in the memory.

14. The secured module of claim 9, wherein the information obtained from the encrypted digital data comprises new encryption keys.

15. The secured module of claim 9, wherein the information obtained from the encrypted digital data comprises an identifier of a function; and wherein the controller is further configured to use the function to modify existing encryption keys stored in the memory to obtain new encryption keys.

16. The secured module of claim 9, wherein the controller is further configured to receive plural messages from respective plural portable devices, with each of the sequence numbers including an indication of the respective one of the plural portable devices with which it is associated.

* * * * *